DIRECT DIGITAL CONTROL INTERFACING CIRCUITRY

Filed July 6, 1967 9 Sheets-Sheet 1

INVENTORS.
EARL C. CHANNELL
CHARLES J. CLARKE, JR.
JOSEPH GORMLEY
GEORGE W. Mc KNIGHT
LEROY N. TEMPLETON, JR.
J. Donald Weber Jr.
ATTORNEY.

INVENTORS.
EARL C. CHANNELL
CHARLES J. CLARKE, JR.
JOSEPH GORMLEY
GEORGE W. McKNIGHT
LEROY N. TEMPLETON, JR.
BY [signature]
ATTORNEY.

INVENTORS.
EARL C. CHANNELL
CHARLES J. CLARKE, JR.
BY JOSEPH GORMLEY
GEORGE W. Mc KNIGHT
LEROY N. TEMPLETON, JR.
J. Donald Weber, Jr.
ATTORNEY.

INVENTORS.
EARL C. CHANNELL
CHARLES J. CLARKE, JR.
BY JOSEPH GORMLEY
GEORGE W. Mc KNIGHT
LEROY N. TEMPLETON, JR.
ATTORNEY.

INVENTORS.
EARL C. CHANNELL
CHARLES J. CLARKE JR.
BY JOSEPH GORMLEY
GEORGE W. Mc KNIGHT
LEROY N. TEMPLETON JR.
J. Donald Weber
ATTORNEY.

INVENTORS.
EARL C. CHANNELL
CHARLES J. CLARKE, JR.
BY JOSEPH GORMLEY
GEORGE W. Mc KNIGHT
LEROY N. TEMPLETON JR.
ATTORNEY.

INVENTORS.
EARL C. CHANNELL
CHARLES J. CLARKE, JR.
BY JOSEPH GORMLEY
GEORGE W. Mc KNIGHT
LEROY N. TEMPLETON, JR.
ATTORNEY.

INVENTORS.
EARL C. CHANNELL
CHARLES J. CLARKE, JR.
JOSEPH GORMLEY
GEORGE W. Mc KNIGHT
LEROY N. TEMPLETON, JR.
BY
ATTORNEY

INVENTORS.
EARL C. CHANNELL
CHARLES J. CLARKE, JR.
JOSEPH GORMLEY
GEORGE W. Mc KNIGHT
LEROY N. TEMPLETON, JR.
BY
J. Donald Welsh
ATTORNEY.

United States Patent Office 3,522,588
Patented Aug. 4, 1970

3,522,588
DIRECT DIGITAL CONTROL INTERFACING CIRCUITRY

Charles J. Clarke, Jr., Hopkinton, Mass., Earl C. Channell, Maple Glen, and Joseph Gormley, Southampton, Pa., and George W. McKnight, Medfield, and Leroy N. Templeton, Jr., Sherborn, Mass., assignors to Honeywell Inc., Minneapolis, Minn., a corporation of Delaware Filed July 6, 1967, Ser. No. 651,586
Int. Cl. H04q 9/00
U.S. Cl. 340—147 10 Claims

ABSTRACT OF THE DISCLOSURE

A system is disclosed wherein a single control unit controls a plurality of individual controlled elements by means of a simple and uncomplicated interconnection scheme. In accordance with that scheme data is supplied simultaneously, in parallel, to a plurality of controlled elements, however, through logical control circuitry, only a selected one of the controlled elements is enabled to respond to the supplied data. Logical circuitry for accomplishing such selection is also disclosed.

This invention relates to control systems. More particularly, the invention relates to systems wherein a large plurality of individual elements are controlled by a single control unit.

This invention relates to devices or designs which are described in copending applications. For example, two copending applications of Joseph Gormley, the instant inventor, are of interest. One application entitled Electrical Apparatus, bearing Ser. No. 589,447, was filed Oct. 25, 1966. Another application entitled Electrical Apparatus, bearing Ser. No. 582,109 was filed on Sept. 2, 1966. Also related is a copending application of William F. Newbold, entitled Electrical Apparatus, bearing Ser. No. 433,875 and filed on Feb. 19, 1965. Two related copending design applications of interest are each entitled Face Panel for a Control Instrument. These applications which bear Ser. Nos. 3,468 and 3,420 respectively, were filed on Aug. 11, 1966 by R. C. Miller. Each of the listed utility and design applications is assigned to the assignee of this application.

Control systems are known wherein a plurality of controlled elements are supervised or controlled by remote control units. Such systems are known as direct digital control (DDC), supervisory control, remote control or by similar nomenclature. However, in the past the problem has arisen that a direct communication between each of the controllers and the remote controlling unit has been required. Obviously, if as many as one or two dozen controlled elements are to be operated, a large number of interconnections are required. Furthermore, if the controlled elements and the control unit are spaced apart by any considerable distance, the cost of the materials required for interconnection becomes prohibitive.

Consequently, this system provides for a plurality of controlled elements which are controlled by a single control unit. The interfacing circuitry is limited to substantially the number of interconnections required for a single controlled element plus suitable addressing circuitry. By utilizing coded signals, a large number of circuits or controlled elements may be selected by means of a small number of interconnections. Also, a plurality of circuits or "stations" which operate the controlled elements and which are capable of interconnection with the control unit (by the interfacing circuitry) are provided.

Thus, it is one object of this invention to provide a control system.

Another object of this invention is to provide a control system which is relatively simple in configuration.

Another object of this invention is to provide a control system wherein a plurality of controlled elements are designated by code symbols such that a relatively few signals from a control unit can select one of a plurality of controlled elements.

These and other objects and advantages of this invention will become more readily apparent when the following description is read in conjunction with the attached drawings, in which.

Figure 1:
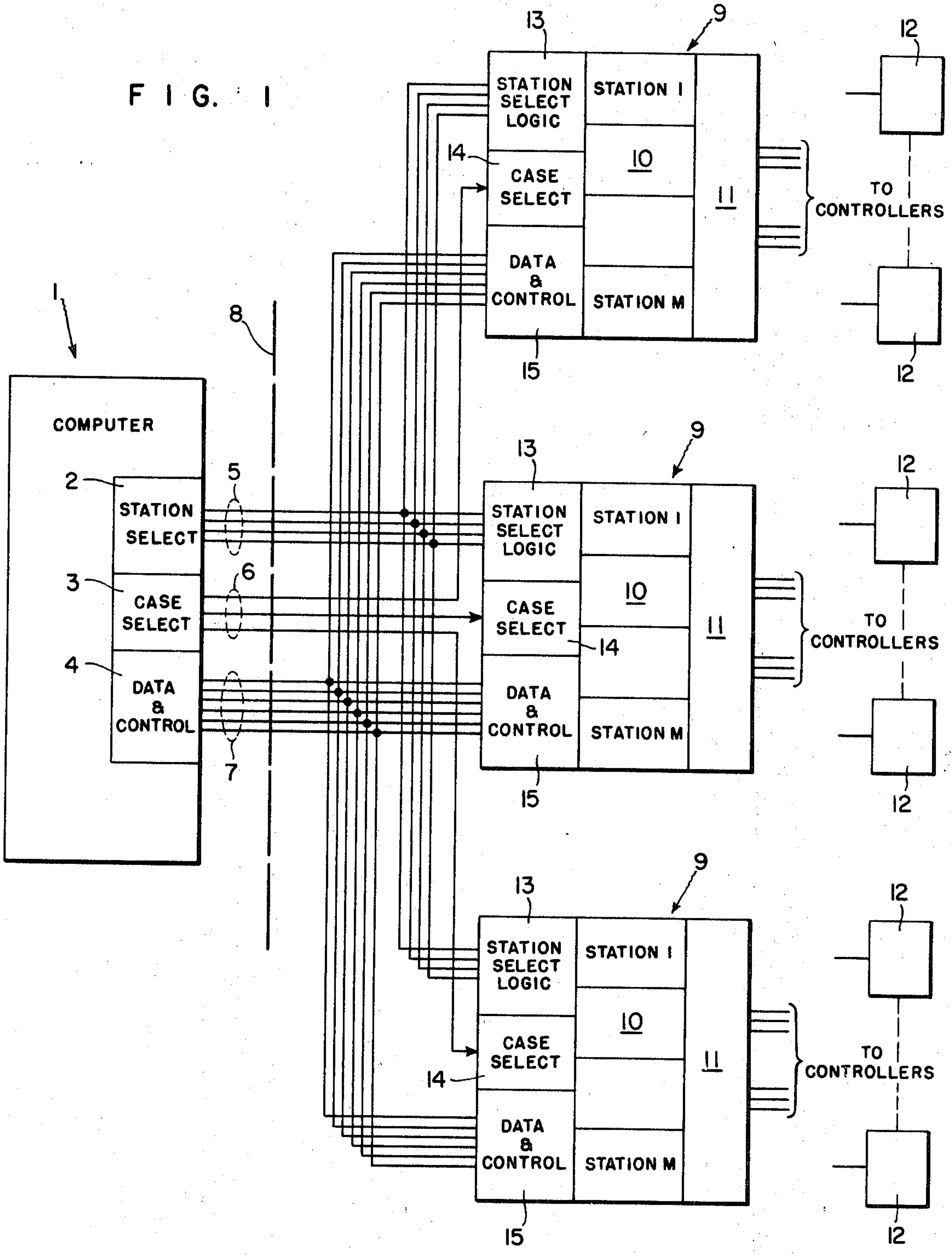
FIG. 1 is a block diagram of the system of the subject invention.

Referring now to FIG. 1, there is shown a block diagram of a system which forms the basis of the subject invention. In this system, a single controlling element, for example computer 1, is utilized to control a plurality of controlled elements. The controlled elements 12 may represent valves, gates, wheels or any suitable control element. As is shown, a plurality of cases (N), each comprising a plurality of stations (M), controls a plurality of N·M controlled elements. In many situations the N·M product can be quite large. For example, in one embodiment, six cases, each of which comprises 18 stations control 108 controlled elements. These elements are controlled by a single computer. In the past, this arrangement would have required interfacing circuitry wherein at least 144 connections between the computer and the controlled elements would be required. However, in the present system the number of interconnections made to the computer is a relatively small number, in the neighborhood of 18 connections, which is a substantial reduction of connection requirements.

Computer 1 comprises several sections, three of which are suggested by the station select 2, case select 3, and data and control 4 portions thereof. The case select portion 3 of the computer has a plurality of output wires 6. Wires 6 are arranged to be individually connected to each of the N cases 9. That is, the case select apparatus, through coded circuit arrangements, provides a signal on one of the wires 6. This signal is applied, via the associated wire, to the proper case via the case select portion 14 thereof such that the individual case 9 is enabled relative to further input signals. In the illustrative example, the wires 6 would include N conductors with one conductor connected between the case select portion 3 of the computer 1 and the case select portion 14 of each case 9.

The station select portion 2 of computer 1 is connected, via wires 5, to the station select logic portion 13 of case 9. It is noted that portion 13 comprises a station select logic circuit which includes typical gating logic. The logic is arranged in a coded configuration such that the specific, single station out of the M or 18 stations in a particular case may be selected by a minimum number of wires. For example, in one embodiment, a three-out-of-six code is utilized to select one out of 18 stations in a case. With this combination, it is apparent that only 6 wires are required to be connected to the station select portion 2 of computer 1. Thus, a total of 12 wires, that is six wires or connections at the station select portion 2 and six wires or connections at the case select portion 3 of computer 1 are required to select the case and station whereby one out of 108 stations is selected. It will be understood that both case and station selection signals are required in order to enable a particular station.

The wires 7 are connected between the data and control portion 4 and the data and control portion 15 of computer 1 and cases 9, respectively. The signals supplied by computer 1 along wires 7 relate to specific functions to be performed such as update, feedback, clear and the like. The number of wires 7 is controlled by the number of functions which are desired to be performed. However, the actual number of conductors comprising wires 5, wires 6 and wires 7 still produces a small total when the large number of stations to which controls and function signals are to be supplied is considered.

That the number of wires or interfacing connections is small is indicated at the interface surface 8. Thus, to the left of the system shown in FIG. 1 is the control unit, or computer 1. For the entire system on the right side of the drawing, an average number of approximately 18 connections is made to the computer. This number of connections can be reduced still further as will become apparent.

On the right side of interfacing surface 8 are N cases 9 each containing M stations 10. The interconnecting lines between the computer 1 and the stations 10 are supplied between the respective station select and data control portion thereof. Once the stations have been selected and operated, a signal is supplied from the station, via interfacing circuitry 11 to the associated output device or controlled element 12, controlled elements may be termed controllers. The operation of the system is straightforward in that a signal is produced by the case selection portion 3 of computer 1 and is supplied to the appropriate case 9. This case signal enables logic circuitry. The station select portion 2 of computer 1 then supplies signals via wires 5 in accordance with a preselected code arrangement. This code arrangement of signals is provided to select a particular station, for example station 2 in each of the cases. However, the station select logic 13 is enabled only in that case wherein a case select signal has been supplied via wires 6. In those cases where the case select signal has not been applied, the station select logic circuitry 13 is inhibited and the station is not enabled for receiving or producing further information.

The data and control portion of computer 1 provides signals on wires 7 which signals indicate the update, or similar functions, and are applied to the data and control circuit portion 15 of case 9. However, these function or information signals are effective only in a station which has been activated through the coincident application of case select and station select signals. The station which has been selected operates upon the signal supplied along wires 7 to perform the requested function. The station then produces an output signal which is applied, via interfacing circuitry 11, to the controllers 12. Controllers 12 then perform a function which is ascribed thereto in accordance with the data and control signals. As will appear hereinafter, a feedback loop may be provided to the computer to indicate the operation of the station 10 or the controller 12.

Figure 2:
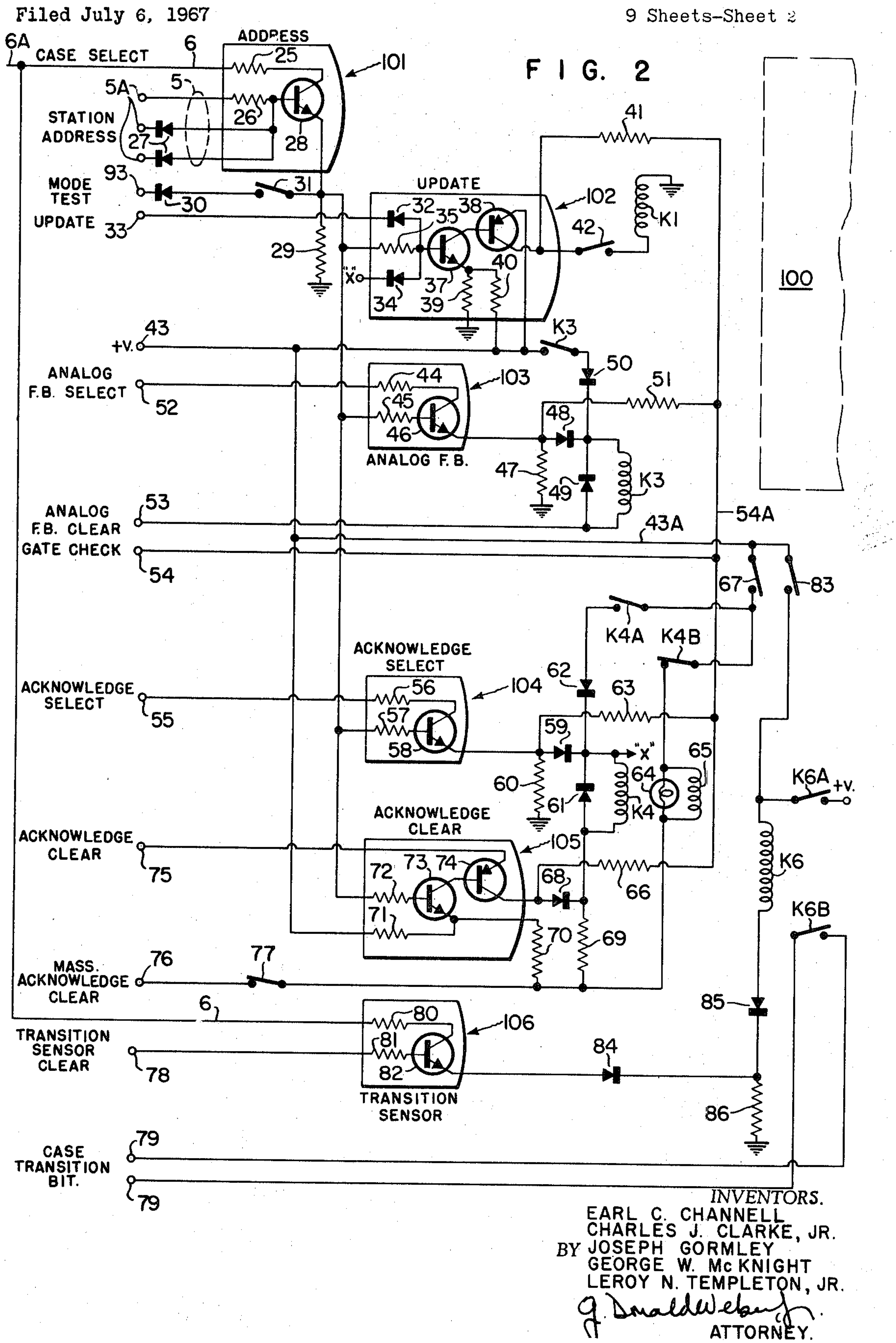
FIGS. 2, 2A is a schematic diagram of one embodiment of the invention.
Figures 2A, 4:
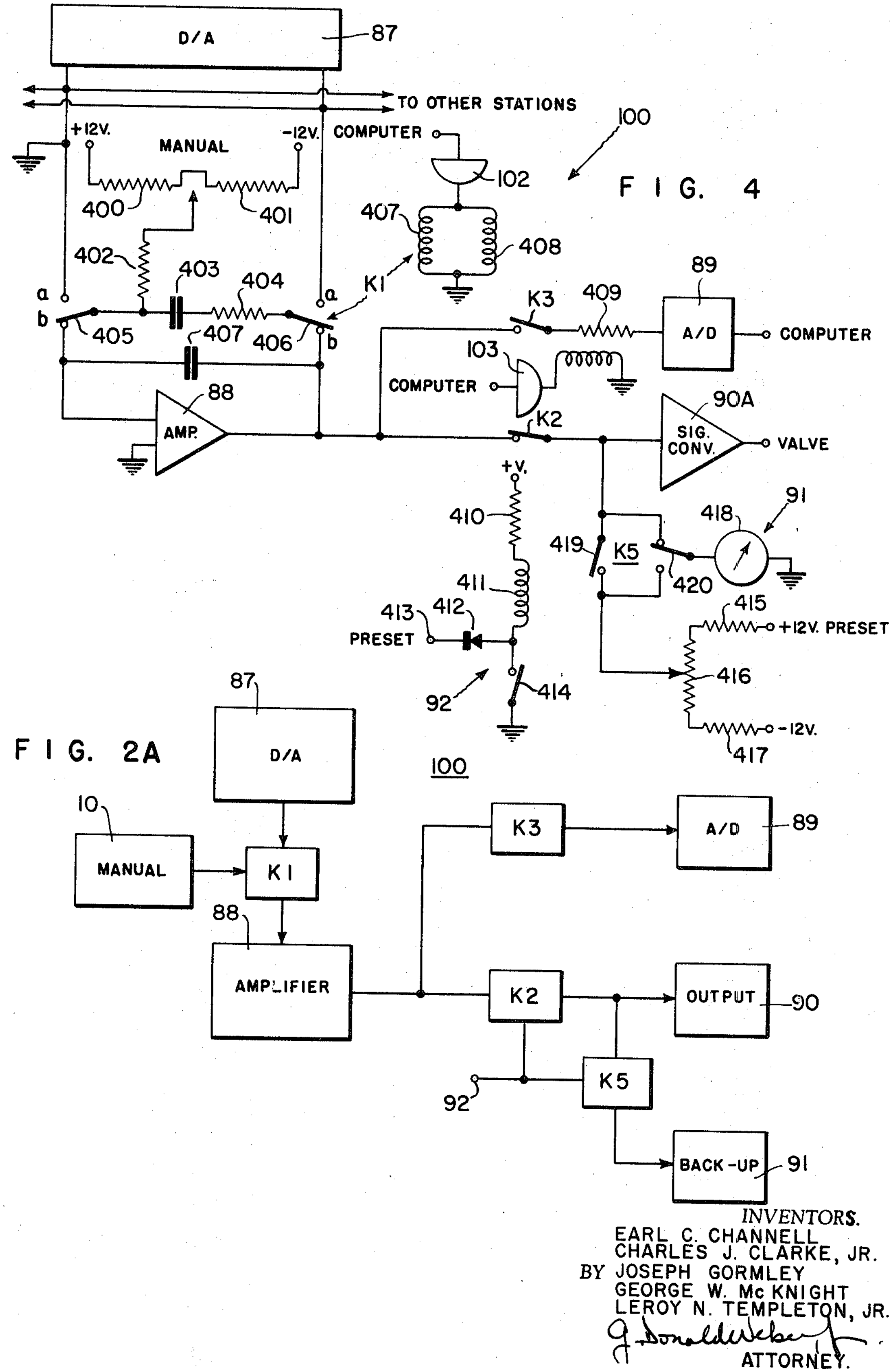
FIG. 4 is a schematic of one type of control station circuitry.

Referring now to FIGS. 2, 2A, there is shown a schematic diagram of one of embodiments of this invention. More particularly, this diagram is related to the portion at the right of the circuit shown in FIG. 1 and does not include the computer 1 per se. In FIG. 2, components which are similar to components in FIG. 1 bear similar reference numerals. The terminals shown in FIG. 2 may be considered to be the connections between the specific wire and the associated portion of the computer 1. For example, terminal 6A represents a terminal of one of the wires 6 at the case select portion 3 of computer 1. The wire 6 as supplied to the case (only one of which is illustrated in FIG. 2) supplies signals to one input of the address gate 101 and to one input of the transition sensor gate 106.

Terminals 5A may be considered to represent three of the connections between the station select logic portion 13 of a case 9 or the interconnection between the wires 5, as suggested at the right side of FIG. 1. Terminals 5A are connected via suitable means to provide inputs to address gate 101.

Terminals 93, 33, 43, 52, 53, 54, 55, 75, 76, 78 and 79 may be considered to be the terminals which are connected to data and control portion 4 of computer 1. These input terminals are connected to inputs of a plurality of gates or circuits which provide the station select logic to portion 13, case select portion 14 and data and control portion 15 of a particular case.

In particular, gate 101 is the address gate by which the case and station selection is made. The appropriate case select wire 6 is connected via resistor 25 to the collector electrode of transistor 28. The case select signal, when supplied, is provided to gate 101 via wire 6. The station address code signals are supplied to terminals 5A. These signals are supplied to the base of transistor 28. Although various code combinations may be provided for the stations, in the preferred embodiment, three inputs are utilized with two of the inputs being connected to diodes 27 and the third input being connected to resistor 26. Resistor 26 transfers the applied input signal to the base of transistor 28 while diodes 27 are, for example, connected in such a manner that the application of address signals thereto render the diodes nonconductive. Thus, in the presence of three high level signals on the illustrated terminals 5A, diodes 27 are reversed biased while a signal is applied to the base of transistor 28, via resistor 26, which signal tends to render transistor 28 conductive. Obviously, in the absence of a high level signal at the cathode of either of diodes 27, the base electrode of transistor 28 is clamped to the level applied at the cathode of the conductive diode 27.

The coding arrangement is designed such that a particular code energizes all of the stations having that address. However, each station in a case has a different address. Therefore, only the station which also receives a case select signal is energized.

As noted supra, the high level signal supplied to the base of transistor 28 tends to render the transistor conductive. In the embodiment shown, a coincident high level signal at the collector electrode of transistor 28 is required in order to render the transistor conductive. This signal is supplied by the case select circuitry via wire 6. In the absence of a signal at the collector electrode, a signal at the base electrode of transistor 28 is ineffective to permit conduction.

The emitter electrode of transistor 28 is connected to a suitable reference sourve via load resistor 29. A suitable resistor 29 is utilized in order to provide a desirable potential level at common junction 36. Common junction 36 is connected to the mode test response terminal 93 via diode 30 and switch 31. Switch 31, as shown, is a normally open switch which is selectively closed in order to determine the signal condition at common junction 36. Diode 30 is provided in order to permit the selective sampling while providing isolation between this address gate and the address gates in the remainder of the system. The mode or test response terminal 93 is utilized by the system to determine whether or not the specific station is computer controlled. For example, if the computer is "off-line" and has not taken control of the address gate 101, a testing of the condition at common junction 36 via terminal 93 coincident with closure of switch 31 will be informative.

A similar type of function is produced by transition sensor gate 106. Gate 106 includes transistor 82 which has the collector thereof connected via resistor 80, to wire 6 which is connected to case select terminal 6A. Gate 106 is thus, connected to the wire 6 and the terminal 6A which is connected to address gate 101. Thus, gate 106 is rendered operative when the proper case select signal is supplied. The base of transistor 82 is connected via resistor 81 to terminal 78 which is the transition sensor clear terminal and to which is normally supplied a +25 volt signal. The emitter electrode of transistor 82 is connected to a suitable reference potential, for example ground, via diode 84 and resistor 86. Diode 84 provides a unilateral connection whereby isolation is effected as well as a voltage dropping function. Resistor 86 is a load resistor for establishing a potential at the cathode of diode 84.

Connected to load resistor 86 is the cathode of diode 85. A coil K6, which is the coil or solenoid for a relay, is connected to the anode of diode 85. A switch 83 such as a microswitch or the like, is connected to another terminal of coil 86 and to a suitable reference potential source, for example +18 volts. The connection to the reference source is by means of wire 43A which is connected to terminal 43. Switch 83 is a normally open switch which is momentarily closed, for example, when a manual switch is operated. The manual switch may be operated by the system operator when switching from one mode of operation to another.

The momentary closure of switch 83 causes current flow through coil K6, diode 85 and resistor 86 to ground. Current passing through coil K6 closes the contacts K6A and K6B. Contacts K6A are connected between the coil K6 and a suitable potential +V, for example +18V. This contact closure tends to operate as a latching of the relay wherein the current is continually supplied to the coil K6 via the closed contacts K6A. In addition, current flow through coil K6 closes contacts K6B whereby terminals 79 are connected together. Terminals 79 may be connected to a suitable means, for example a computer, such that the closure of contacts K6B is detected and a transition in the state of a station in a particular case is detected and stored in the computer. In some cases, it may be desirable to include an indicator such as a lamp or the like (not shown) which is actuated upon the closure of contacts K6B. However, such indication is not required and since the transition is produced by operating a switch on the front panel (see the design cases noted supra), the position of the switch on the front panel is indicative of the transfer to transition of a station from one mode of operation to another.

The output signal supplied by address gate 101 at common junction 36 is also supplied as an input to gates 102, 103, 104 and 105. Update gate 102, in this embodiment, comprises a pair of opposite conducting type transistors 37 and 38. The base of NPN transistor 37 is connected via resistor 35 to common junction 36. A pair of diodes 32 and 34 have the anodes thereof connected to the base of transistor 37. The cathode of diode 32 is connected to terminal 33. The signal which is supplied at terminal 33 is a positive going signal on the order of +25 volts and is applied for approximately 3 milliseconds.

The cathode of diode 34 is connected to an output of gate 104 and is signified by X. Again, this coding arrangement requires that both diodes 32 and 34 be reverse biased by high level signals at the cathodes thereof in order to permit a high level signal to be applied to the base of transistor 37 via resistor 35.

The collector electrode of transistor 37 is connected to the base electrode of PNP transistor 38. This emitter electrode of transistor 37 is connected, via load resistor 39, to a suitable reference potential, for example ground. The bias resistor 40 is connected between the emitter electrode of transistor 37 and the reference potential represented by terminal 43. This reference potential terminal is also connected directly to the emitter electrode of transistor 38. The collector electrode of transistor 38 is connected via resistor 41 to the gate check terminal 54.

The collector electrode of 38 is further connected to normally-open switch 42 and, thence, to coil K1 which is connected to ground. Gate check terminal 54 is connected to a level sensing circuit (not shown) which detects the level of the signals supplied thereto. Thus, as will be noted hereinafter, terminal 54 is connected to an output of each of gates 102 through 105. The level sensing circuit is operative to detect whether only one or more than one levels of output signals are supplied thereto. This provides a reliability function. Thus, if an excessive number of gates have been triggered, the output signal will be too high and an error will be signified by error means (not shown).

When the circuit is in the manual mode of operation, as will hereinafter be described, switch 42 is open. However, when the system is in the computer mode of operation, switch 42 is closed and an output signal from gate 102 will be supplied to coil K1. Coil K1 is the solenoid coil for switch K1 which forms a portion of the sample and hold amplifier circuit 100 shown in detail at FIG. 2A.

As noted supra, application of the proper signals to the inputs of gate 102 will supply a high level signal to the base of transistor 37. This high level signal causes transistor 37 to be rendered conductive. When transistor 37 is rendered conductive, the potential level at the base of transistor 38 is sufficiently low that transistor 38 is also turned on or rendered conductive. Emitter-collector current exists in transistor 38 when it is rendered conductive and supplies a signal, via resistor 41, to gate 54 as well as providing a current through coil K1. When a current exists in coil K1 the contacts thereof are closed and the circuit path between the digital to analog converter 87 and amplifier 88 is closed. That is, the digital to analog converter which may be a part of a separate computer operates upon the information supplied by computer 1 (FIG. 1) and generates an analog signal. This signal is selectively passed through the closed contacts of switch K1 to amplifier 88 and operated thereupon. As will appear hereinafter, the contacts of switch K2 are normally closed wherein the output signal of the amplifier is applied to output device 90. Switches K3 and K5 are normally open wherein the output signal is not supplied to the associated circuits.

It will be noted, that signals from the D/A converter 87 cannot update the amplifier output produced by amplifier 88 in the absence of an output signal from update gate 102. That is, in the absence of such a signal, the contacts of switch K1 are normally open and no connection exists between D/A converter 87 and amplifier 88.

Analog feedback gate 103, as noted supra, has one input connected to common junction 36 and, thereby, receives a signal from address gate 101. The input signal is supplied via resistor 45 to the base of transistor 46. The collector electrode of transistor 46 is connected via resistor 44 to analog feedback select terminal 52. This terminal is connected to a source in the computer which supplies a signal of +25 volts, for example. With the concurrent application of the input signals to the base and the collector electrodes, transistor 46 is rendered conductive. The emitter electrode of transistor 46 is connected to a suitable reference potential, for example ground, by a load resistor 47. The emitter electrode of transistor 46 is also connected to the gate check terminal 54 via resistor 51 for the reliability check noted supra.

Also associated with analog feedback gate 103 is the analog feedback clear terminal 53. This terminal is connected to the computer and receives signals having a magnitude of +25 volts, for example. Connected to terminal 53 is a parallel combination comprising diode 49 and solenoid coil K3. One terminal of the coil is connected to the anode of diode 49 which is connected to terminal 53. Another terminal of coil K3 is connected to the cathode of diode 49 and the combination is connected to the cathode of diode 48. The anode of diode 48 is connected to the emitter electrode of transistor 46. In series with the parallel combination of diode 49 and coil K3 is the series combination of diode 50 and contacts K3. Contacts or switch K3 are connected between the reference potential terminal 43 and the anode of diode 50. The cathode of diode 50 is connected to the cathode of diodes 48 and 49.

In the case of analog feedback gate 103, the application of the proper signals at the base and the collector electrode thereof via resistors 45 and 44, respectively, renders transistor 46 conductive. A signal is produced at the emitter of transistor 46 and is applied to gate check terminal 54 via resistor 51. Additionally, the output signal produced by transistor 46 is supplied via diode 48 to coil K3. In the absence of a feedback clear signal, diode 49 is reverse biased by a signal from transistor 46 and current passes through coil K3. When current passes through coil K3, the contacts K3 connected between terminal 43 and diode 50 are closed and the high level potential at terminal 43 is latched to the coil K3. This connection of the potential source sustains the current in the coil. Simultaneously, switch K3 in the amplifier network 100 closes and the output signal from amplifier 88 is transferred to the analog to digital converter 89. Analog to digital converter 89 may be associated with the computer and provide information thereto. This information, after operation thereto by the computer, is utilized to provide a signal to the digital-to-analog converter 87.

When it is desired to remove the circuit from the analog feedback mode, a high level signal, for example +25 volts, is supplied at terminal 53 by the computer. This high level signal is applied to diode 49. The signal supplied tends to render diode 49 conductive and, thereby, reverse bias diode 50. Additionally, coil K3 is short circuited (i.e. a similar potential exists at each terminal thereof) whereby the holding action of solenoid K3 (relative to contacts K3) is terminated. Consequently, the contacts of switches K3 are released to the normally open condition. Thus, coil K3 is no longer latched in the operative condition and the A/D converter 89 is disconnected from amplifier 88.

Thus, it is seen that the update gate 102 is utilized to selectively permit the amplifier to be updated. That is, the amplifier can selectively receive new information to be operated upon. The analog feedback gate 103 permits the amplifier to selectively readout the status thereof such that the status thereof can be detected. A connection to amplifier 88 permits the cycle to be continued. Thus, the essential features of this invention are already defined. These features include the update and analog gates as well as the coded address gate arrangement. Additional features may be utilized as hereinafter described.

The acknowledge select gate 104 is an optional circuit utilized to perform the function of acknowledging that a particular case and station have been selected and are under computer control. Gate 104 includes a transistor 58 which has the base thereof connected, via resistor 57, to common junction 36 or the output of address gate 101. The collector electrode of transistor 58 is connected, via resistor 56, to terminal 55. Terminal 55 may be considered to be a computer output and selectively supplies a +25 volt signal to the collector electrode of transistor 58. With the concurrent application of inputs to the base and collector electrodes thereof, transistor 58 is rendered conductive and produces an output signal. An output signal is produced across resistor 60 which is connected between the emitter of transistor

58 and a suitable reference potential, for example ground. The output of gate 104 is connected to the gate check terminal 54 via resistor 63 reliability checking purposes.

The output of gate 104 is further connected to the anode of diode 59. The cathode of diode 59 is connected to the terminal X, as noted supra, which is an input to gate 102. The output signal at the cathode of diode 59 is further connected through coil K4 to a resistor 69. Resistor 69 is connected via normally closed switch 77 to the mass acknowledge clear terminal 76 which is connected to the computer. A diode 61 is connected in series with resistor 69 and in parallel with coil K4. Diode 61 is so poled that an output signal from gate 104 reverse biases diode 61 and permits a signal to pass through coil K4. Also in series with the output of gate 104 is diode 62, normally open switch contacts K4A and switch 67. Switch 67 is another switch similar to switch 42 which is normally open when the system is operating in the manual control mode but is closed when the system is operating in the computer control mode.

Also connected in series with switch 67 is the normally closed contact K4B and the parallel combination of lamp or indicator 64 and coil 65. Coil 65 is the solenoid associated with an optional servo tracking network described hereinafter. This combination is further connected to the junction between resistor 69 and switch 77. Thus, assuming computer control with switch 67 closed, a circuit exists between the reference potential 43 via switch 67, normally closed contacts K4B, indicator 64 and switch 77 to terminal 76. Thus, lamp 64 is normally illuminated and switch K3 is normally open. If now, appropriate input signals are supplied to gate 104, transistor 58 is rendered conductive and a signal is produced thereby. This signal passes through diode 59, coil K4 and resistor 69 to terminal 76. A signal passing through coil K4 closes the contacts K4A and opens the contacts K4B. Thus, light 64 is extinguished and the current path is established between the reference potential 43 and terminal 76 via contacts K4A, diode 62, coil K4, and resistor 69. This gate circuit portion has the function of extinguishing the acknowledge lamp whereby the operator will know which case and station has been selected by the computer and is now under computer control.

Acknowledge clear gate 105 comprises the pair of opposite conductivity type of transistors 73 and 74. Transistor 74 is a PNP transistor and transistor 73 is an NPN transistor. The collector electrode of transistor 73 is connected to the base electrode of transistor 74. The inputs to the gate are supplied via terminal 75 which is connected directly to the emitter electrode of transistor 74 and by the output of gate 101 which is connected, via resistor 72, to the base of transistor 73. The emitter electrode of transistor 73 is connected via resistor 71 to the reference potential terminal 43. The emitter electrode of transistor 73 is additionally connected via resistor 70 and switch 77 to the mass acknowledge clear terminal 76. The collector electrode of transistor 74 is connected to the anode of diode 68 which is connected to the junction between resistor 69 and diode 61. The output or collector electrode of transistor 74 is further connected via resistor 66 to wire 54A which is connected to gate check terminal 54 as noted supra.

Gate 105, also an optional circuit, serves the function of clearing or disconnecting the effect of the acknowledge select gate 104. That is, assuming switch 77 is the normally closed position, the application of a +25 volt signal to the acknowledge clear terminal 75 provides a high level signal at the emitter electrode of transistor 74. This signal is sufficient to cause transistor 74 to conduct. When transistor 74 conducts, a signal is supplied via resistor 66 to wire 54A. This signal is used for reliability check purposes. Additionally, an output signal is produced at diode 68 which raises the potential at the anode of diode 61 sufficiently that diode 62 is reverse biased and coil K4 is short circuited. Thus, contacts K4A return to the normally open condition and contacts K4B return to the normally closed position. With this operation, lamp 64 becomes illuminated. That is, the reference potential supplied at terminal 43 is applied, via switch 67 and closed contacts K4B to, lamp 64. Thus, gate 105 serves to individually disconnect or disable the acknowledge select gate 104.

Frequently, it is desirable to cause the substantially simultaneous disconnection or disabling of all of the stations (only one of which is illustrated in FIG. 2) in a case or even in an entire system. For this purpose, switch 77 is provided. That is, normally closed switch 77 is opened, either manually or under computer control, whereby all of the acknowledge gates connected thereto are disconnected. The opening of switch 77 causes the deactivation of coil K4 and the contacts controlled operated hereby as noted supra, in response to a signal produced by gate 105.

The several gates 101X106 are utilized to control the sample and hold amplifier circuit 100 or at least portions thereof. The operation of switch K1 to selectively interconnect the D/A converter 87 and amplifier 88 has been described. Similarly, the operation of switch K3 to selectively interconnect the amplifier 88 and the A/D converter 89 has been described. A further switch K2 interconnects the output of the amplifier 88 and the output device 90. Output device 90 may be any typical controlled element such as a valve or the like. Switch K2 is a normally closed switch or relay contacts such that as an amplifier produces an output, the output is supplied directly to the output device 90. A backup device 91 is connected to the output device 90 by means of switch K5. Backup device 91 may be any standard preset or fail-safe type of circuitry which is utilized to operate the output device 90 in a predetermined manner in the event of a failure in the amplifier operation as, for example, in the event of computer down time.

Switch K5 is a normally open switch such that the backup device 91 is only selectively connected to output device 90. As is shown, switches K2 and K5 are interrelated and may be controlled by an external control means 92. An external control signal may be supplied by means of a manual type switch or by the computer circuit as will appear hereinafter. The interrelationship between switches K2 and K5 is such that the application of a signal at terminal 92 causes switch K2 to become an open circuit while simultaneously causing K5 to become a closed circuit. In fact, switches K2 and K5 may represent normally closed and normally open terminals respectively on a single switch element controlled by a single solenoid or the like. Thus, it is clear that a single control element such as computer 1 can control, through proper sequencing or the like, the interconnection between the D/A converter and the amplifier 88; the amplifier and the A/D converter 89; the amplifier 88 and the output device 90; and the backup circuitry and the output device 90 as well.

Figure 3:
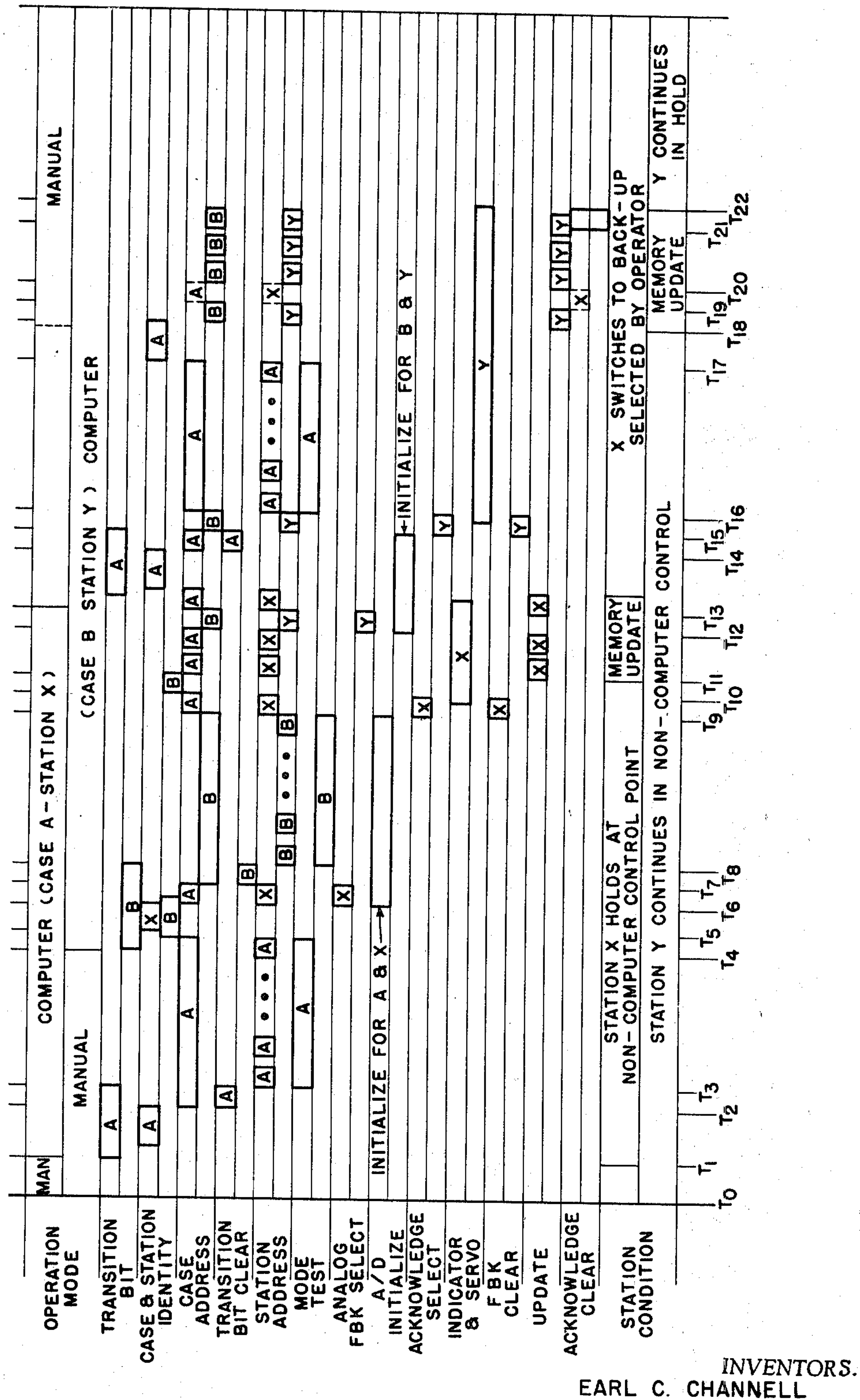
FIG. 3, is a timing diagram representing the sequences of the operation of the system.

The operation of the circuit shown in FIG. 2 is more readily understood when a description of the timing diagram shown in FIG. 3 is concurrently examined.

Referring now to FIG. 3, there is shown a timing diagram for the operation of the system described herein. FIG. 3 is to be considered in conjunction with other figures. In the illustrative timing diagram, operation ise described for two separate stations. The stations are designated as station X and station Y. These stations may be in different cases such as case A and case B as shown. It is to be understood, of course, that the two stations may, in effect, be included within a single case. This diagram shows the concurrent operation of two stations. The operation shown is not meant to be limitative of the invention. It is contemplated that many of the operations shown may occur concurrently or in seriatum depending upon the program arrangement in the main frame of the controlling computer.

At time period T0 each of stations X and Y are in the manual operation mode. That is, sample and hold amplifier 10, as shown in FIG. 2, is operating such that the manual control network (FIG. 4) is supplying the input to the amplifier 88. At time period T1, one of the stations, namely station X, of case A is switched from manual to computer control. This transfer may be effected by means of the operator manually operating a switch to transfer control. The manual operation momentarily closes switch 83 to the transition sensor gate 106. When gate 106 is operated by the switch operation, coil K6 is energized and switch contacts K6B are closed whereby the case transition bit is generated at terminals 79. While the transition bit is being generated, the computer is operating thereupon to identify the case which is producing the transition bit.

At T2, the case address which has been identified is generated along with a transition bit clear signal. This signal is applied at terminal 78 and is effective to operate on transition sensor gate 106 such that relay K6 is deenergized and the transition bit is removed from terminal 79. However, the case select address 101 is now energized. Thus, the addresses of each of the individual stations in the selected case are sequentially applied thereto. The mode response terminal 93 is accessed by means of closing switch 31. As the station addresses 31, 32, . . . A18 are inserted, the station identity is detected at T5.

However, at T4 a further station namely station Y in case B, has been transferred from manual to computer control. This transfer is effective to produce the transition bit for case B which is utilized to identify the case which has the transferred station therein. This information is stored in a suitable location in the computer. At time T6, the computer generates the case address for case A, the address for station X and the analog feedback select signal. This latter signal causes the operation of analog feedback gate 103 in the selected (or addressed) station. Operation of this gate, as noted supra, causes the energization of coil K3 such that switch K3 between amplifier 88 and A/D converter 89 is closed. This permits the initialization of the computer algorithm. That is, the A/D converter 89 is now connected to detect the conditions and signals produced by amplifier 88 and produces a signal indicative thereof which signal is fed to the computer. The computer uses these signals to set any necessary conditions or the like. Thus, as is seen in the station condition line, although the transfer from manual to computer control has been noted, station X remains at the noncomputer control point until the signals from the A/D converter has initialized the computer circuitry and the computer is in the same condition as the station prior to the transfer. This permits substantially "balance-free" transfer when switching from manual to computer control.

It is seen that while the A/D converter is initializing for station X, the address for case B is provided along with the transition bit clear which operates upon the associated transition gate 106 in case B. Additionally, at time period T8, the mode test response signal or the station in case B is provided along with the separate sequential, addressing of each of the stations B1, B2 . . . B18 in case B.

At time period T9, the computer returns to station A by generating the case A address, station X address, the acknowledge select signal for station X and the feedback clear signal for station X. The feedback clear signal is applied to the gate 103 and is effective to terminate the connection between the amplifier and the A/D converter. The acknowledge select signal is supplied to gate 104 and is operative to energize relay K4 which deenergizes the indicator light 64 and the optional servo circuit 65 as the case may be. At time period T10, the information from station X in case B is transferred to the computer such that the address of the transferred station is stored in the computer.

At T11, the computer switches back to station X and generates the case A, station X address signals and the station X update signal. At this time the memory capacitor 403 (see FIG. 4) is updated by a signal from the D/A converter 87 in the computer. The station and case address signals and update signals are supplied again prior to the time period T12.

At this latter time period, the computer switches to station Y and supplies the case B and the station Y address signal. The analog feedback select signal for station Y is generated, and similar to the description relative to station X, the associated amplifier and computer is initiallized to provide bumpless transfer. While the computer circuitry is initializing the algorithm for station Y, the computer returns to station X for supplying a further update signal at time period T13.

At time period T13, which is arbitrarily chosen, station X is returned from computer to manual control by means of the operator manually transferring control. This manual transfer of control again causes generation of the transition bit which is utilized to identify the case wherein a transition or transfer of control has occurred.

At time period T14, the case address for case A is generated along with the transition bit clear signal. The transition bit is terminated thereby. And again at T15 the computer switches to station Y and generates the address signals for case B and station Y along with the acknowledge select signal and feedback clear signal. These signals operate as described relative to station X and remove the A/D converter from the circuit while activating or deactivating the associated indicator and servo circuits as required.

At time period T16, the computer switches to the station indentification process wherein the addresses of the stations A1, A2 . . . A18 are generated until the transferred station is identified. The station identification signal is supplied and stored in the computer at time period T17. At time period T18 the computer switches to the station Y and produces the case and station identification signals along with an update signal which is supplied to the update gate. Thus, at time period T18 the memory capacitor of station Y is updated for the first time. That is, the station Y had previously been in the noncomputer control, for example, station Y had previously been in a backup or manual control mode.

At T19, a hypothetical condition is described. Since this condition is hypothetical, the signals related thereto are shown in dashed line. At T19, the case A and station X signals are generated along with an acknowledge clear signal. The acknowledge clear signal is utilized to individually switch the associated station from computer control to a selected type of backup control. Thus, as shown in the operation mode, the acknowledge clear signal is effective to switch the operation of station X from computer to manual control. However, it is to be recognized that this is an optional operation. This type of signal would be utilized for example where the computer had produced a full program cycle or the like such that the computer control would be automatically terminated prior to the manual termination of the computer control.

At time period T20, the computer refers back to the operation described in time period T18, namely, computer control of station Y wherein the addresses of case B and station Y are generated along with update signals. These update signals are supplied to the memory capacitor 403 wherein the memory capacitor is updated such that the amplifier may operate upon this signal to produce a new output signal, if required which is applied to the output device 90.

For purposes of illustration, a mass acknowledge clear signal is shown at time period T21. This type of signal may be utilized, for example, where the computer goes off a line through a malfunction or the like. However, the signal is not limited to malfunction indication. When the mass acknowledge clear signal is supplied via terminal 76 and switch 77, the acknowledge select gates are operated upon such that computer control is automatically removed from the station. Moreover, the stations will immediately switch to a predetermined backup operation. Although the operation mode for station Y continues to be shown as computer mode, computer control has been removed for some reason and the station, internally, operates at a preselected backup mode.

Referring now to FIG. 4, there is shown a schematic diagram of one embodiment of the sample and hold amplifier circuit 100. In FIG. 4, components which are similar to components shown in FIG. 2 bears similar reference numerals. Thus, the D/A converter 87 is connected through a switching means K1 to amplifier 88. As shown in FIG. 4, switching means K1 includes a pair of relays 405 and 406 each having contacts *a* and *b*. The relay which may actually be reed relays are each controlled by the associated coils 407 and 408. Coils 407 and 408 are counterparts to coil K1 as shown in FIG. 2. Coils 407 and 408 are shown as paired coils, although a single coil will suffice in many arrangements. The coils are controlled by the associated coil 407 and 408. Coils 407 and 408 are shown as paired coils, although a single coil will suffice in many arrangements. The coils are controlled by update gate 102 which is shown connected to the computer in this diagrammatic showing.

As noted, a pair of relays are utilized. This pair of relays produces so-called form C switching such as exhibited by a non-shorting, double-throw switch. It is understood that a form A type switching, as by a switch means which is normally open until actuated, can be used to interrupt the connections between the D/A converter 87 and the amplifier 88. The relays are connected such that the contacts *a* of each of the relays is connected to the D/A converter 87. Contact *a* of relay 405 is connected to ground or other suitable reference potential. Contact *b* of switch 405 is connected to one input of amplifier 88. The other input of amplifier 88 is connected to ground or other suitable reference potentials. Contact *b* of switch 406 is connected to the output of amplifier 88. The series combination of capacitor 403 and resistor 404 is connected between the armatures of relays 405 and 406. Capacitor 403 is normally termed the memory capacitor in this type of circuit. That is, in accordance with the conditions of coils 407 and 408, the armatures of relays 405 and 406 are selectively brought into engagement with the associated contacts *a*. This engagement places memory capacitor 403 across the D/A converter terminals whereby the signal produced by the D/A converter 87 is stored in capacitor 403.

Upon the deenergization, for example, of coils 407 and 408, the armatures of switches 405 and 406 are placed in engagement with the respective contacts *b*. This engagement connects capacitor 403 across amplifier 88 whereby the signal stored therein is now discharged through amplifier 88 to produce an output thereby. Capacitor 407 is shown connected in parallel with amplifier 88 and, effectively, in parallel with capacitor 403. Capacitor 407 is a temporary storage capacitor and may be utilized to control the operation of the amplifier 88 when all the relays 405 and 406 are in engagement with contacts *a*. Capacitor 407 prohibits amplifier 88 from producing erroneous information when in the "free-floating" state. However, capacitor 407 may be eliminated in many cases, especially inasmuch as the switching operation of switches 405 and 406 can be sufficiently rapid to avoid any drifting of the amplifier when the input is disconnected from capacitor 403.

The output of amplifier 88 is connected via normally closed switch K2 to the input of signal converting element 90A which is a portion of the output device. The output signal from signal converter 90A may be applied directly to a valve or some similar controlled element.

Signal converter 90A may be a V/I converter or similar type of apparatus.

The output of amplifier 88 is further connected to normally open switch K3. Switch K3 is connected, via resistor 409, to the A/D converter 89. The output of the A/D converter 89 is connected to the control computer. Switch K3 is controlled by an associated coil which is shown connected to and controlled by gate 103 which gate is connected to the computer.

A switch K5 is connected to an input of the signal converter 90A. In the embodiment shown, switch means K5 includes a first switch 419 which is normally open and a single-pole, double-throw switch 420. The single-pole, double-throw switch has the pole thereof connected to a meter 418. A voltage divider network comprising resistors 415, 416 and 417 is connected between suitable potential sources for example +12 volts and −12 volts. The wiper arm of variable resistor 416 is connected to one contact of each of the switches 419 and 420. It is clear, that meter 418 is adapted to selectively indicate the magnitude of the signal supplied to the input of signal converter 90A or the signal supplied by the present network (which comprises the voltage divider circuit) in accordance with the position of the armature of the single pole, double-throw switch 420. Thus, with switch 419 open, and switch 420 in the position shown, meter 418 reads the signal level of the signal applied to the input of signal converter 90A. When switch 420 is switched to the other position, the potential at the wiper arm of variable resistor 416 is detected. This permits the Preset portion of potentiometer 416 to be detected without disturbing the operation of output device.

Switches K2 and 419 are controlled by solenoid 411. Solenoid coil 411 is connected in series with switch 414 and resistor 410 between suitable reference potentials such as +18 volts and ground. Diode 412 has the anode thereof connected to the common junction between coil 411 and switch 414. The cathode of diode 412 is connected to the Preset terminal 413 which is associated with the computer circuitry. This circuit permits manual or computer control of the Preset circuit. For example, if switch 414 is open (as shown) and a low level signal is supplied to terminal 413, solenoid 411 is activated. On the contrary, if a high level signal is supplied at terminal 413 and switch 414 is closed, solenoid 411 is activated. If a high level signal is supplied at terminal 413 and switch 414 is simultaneously open, solenoid 411 is deactivated. Through the means of solenoid 411, the control of the output valve may be switched from computer control to a preset condition. For example, activation of solenoid 411 opens the normally-closed contacts of switch K2 and closes the normally-open contacts of switch 419. Thus, the signal applied at the wiper arm of variable resistor 416 is applied to the input of signal converter 89 via switch 419.

Typically, switch 420 is switched to the Preset read position wherein meter 418 detects the potential at wiper arm resistor 416. Variation of this potential is examined by means of meter 418 and a suitable position of resistor 416 is provided. The proper position of resistor 416 may be arrived at by alternating the position of switch 420 and viewing meter 418. When the input signals supplied to signal converter 90A via switch K2 or, alternatively, via switch 419 are identical, resistor 416 is properly arranged for substantially "bumpless" switching. In addition, the output device can be controlled by means of potentiometer 416. This permits drift free control.

More typically, resistor 416 is set to a position whereby a suitable potential is supplied. The suitable potential, when supplied to the output device 90 will drive said device to a predetermined condition when the Preset signal is supplied to terminal 413 or at switch 414. For example, output device 90 may represent a valve which is driven to the closed (or open) position. In other words, a predetermined, suitable failsafe condition is achieved. This failsafe condition may, in fact, enact a large change (or "bump") in the switching and is typical operation.

Figures 5, 10:
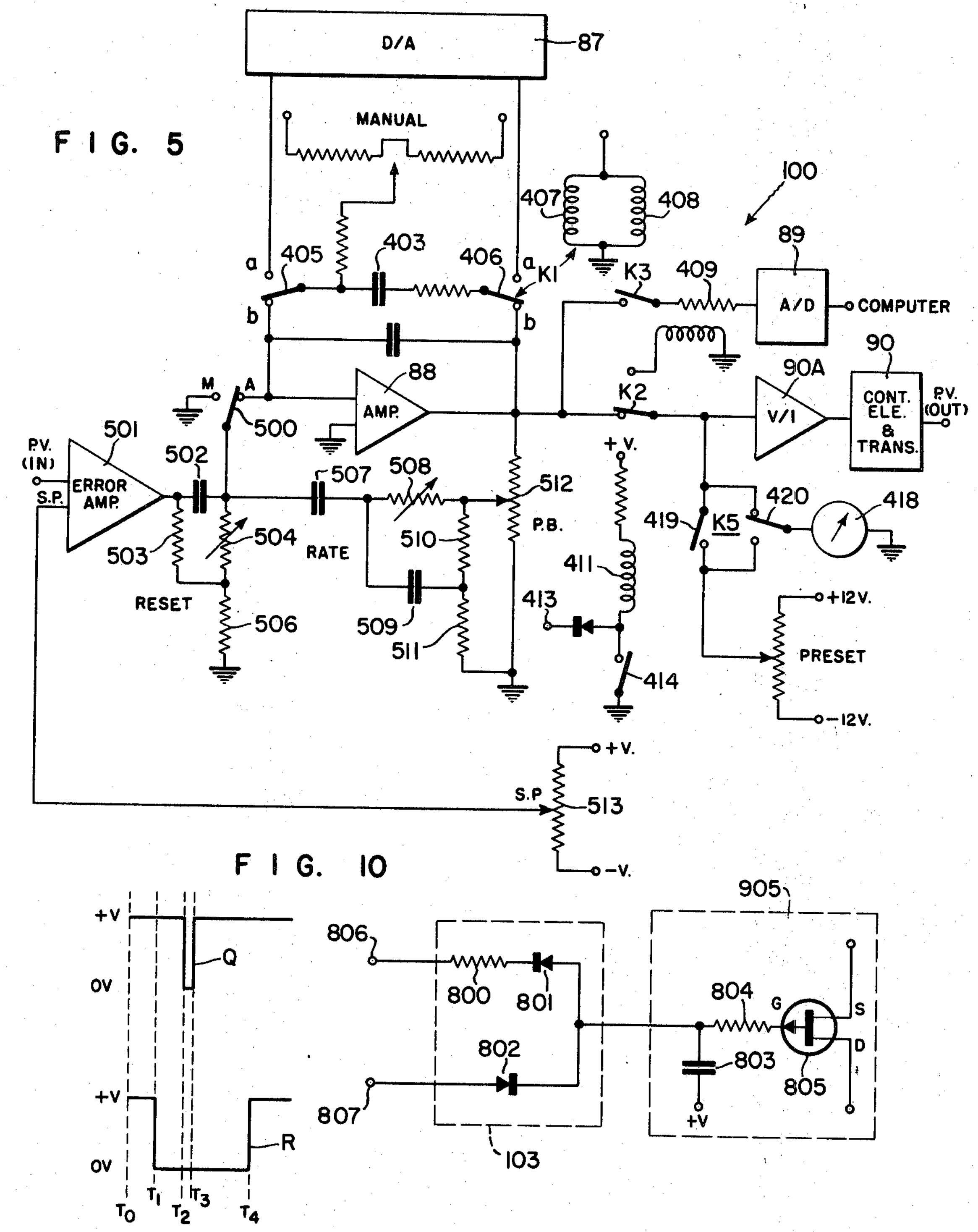
FIG. 5, is a modified version of the circuit shown in FIG. 4.
FIG. 10 is a schematic diagram of the latching gate circuit shown in FIG. 9.

Referring now to FIG. 5, there is shown another embodiment of the sample and hold amplifier circuit 100. The circuit shown in FIG. 5 includes modifications which provide different operation relative to the circuit shown in FIG. 4. As between FIGS. 4 and 5, similar components bear similar reference numerals. One important feature which the circuit shown offers is the ability to supply an error signal. The error signal is supplied by error amplifier 501. The error signal is selectively applied to amplifier 88 in accordance with the operation of switch 500 which is a single-pole, double-throw switch. Switch 500 can alternatively be connected to the M of A contacts where the M (Manual) contact is connected to a suitable reference potential for example ground. The A (Automatic) contact is connected to an input of amplifier 88. Switch 500 and switch 405 are mutually associated switches. That is, when switch 500 is in the M position, switch 405 is engaged with the *b* contact thereof. The manual control network (described relative to FIG. 4) is utilized to control the input to amplifier 88 when in the manual configuration.

In the alternative, when switch 500 is connected to the A contact, switch 405 is connected to the *a* contact thereof. In this switch arrangement, the D/A converter 87 is disconnected from amplifier 88. However, amplifier 88 has the input thereof connected to the error amplifier 501. The error amplifier 501 receives the PV signal as one input and the SP signal as another input. The PV, or process variable, signal is produced by the controlled element and transmitter 90 which is connected to the V/I or converting device 90A. Controlled element and transmitter 90 is similar to the previously described output devices and produces a signal which is indicative of the condition of the controlled element.

The SP or set point signal is applied by the manually adjustable set point circuit. This signal is supplied by a voltage divider network comprising suitable impedance means 513 connected between suitable potential sources +V and −V. Impedance means 513 may include a plurality of coarse adjustment resistors, as well as a fine adjustment variable resistor. The wiper arm of the variable resistor 513 is connected to the SP input amplifier 501. Thus, through a manual adjustment of the wiper arm of resistor 513, a set point or predetermined, satisfactory signal is supplied to error amplifier 501. This signal is designed to provide a proper control signal for the apparatus.

The PV (out) signal produced by controlled element and transmitter 90 is returned as the PV (in) signal at amplifier 501. As the process variable signal varies relative to the set point signal, an error signal is generated by amplifier 501. This error signal is ultimately supplied as an input to amplifier 88 via switch 500. Amplifier 88 produces an output signal in accordance with the input signal supplied thereto. The output signal produced by amplifier 88 is supplied via switch K2 and conversion device 90A to the controlled element and transmitter 90 unto the PV and the SP signal are substantially identical.

The signal supplied by the error amplifier 501 is supplied to the amplifier 88 through a control network. The control network comprises a coupling capacitor 502 which is connected between the output of amplifier 501 and the armature of switch 500. A series combination of resistors 503 and 506 are connected between the output of amplifier 501 and a suitable reference potential, for example ground. Resistors 503 and 506 are related such that the operating characteristics of the circuit, at start-up, are enhanced. One end of variable resistor 504 is connected at the junction between resistors 503 and 506 and the other end of resistor 504 is connected at the armature of switch 500. Resistor 504 is used to provide the adjustment for the Reset function. Capacitor 507, in conjunction with resistor 504 and the amplifier 88, produces an integrating operation wherein the error signal from amplifier 501 is "reset" and reduced. That is, the error signal from amplifier 501 is integrated by the circuit including the Reset network. This network drives the output signal until the output device produces a PV signal which is substantially identical to the SP signal whereby the error signal is eliminated.

Also connected to the Reset network are the Rate and Proportional Band networks. The Proportional Band network includes variable resistor 512 which is connected between the output of amplifier 88 and a suitable reference potential, for example ground. Also, capacitors 502 and 507, associated with resistor 512, provide the necessary reciprocal gain function (i.e. proportional band). Typically, an error signal $E_e$ is supplied by amplifier 501 to amplifier 88 via capacitor 502. An output signal E is generated by amplifier 88 and applied, inter alia, across resistor 512. A proportional value of this output signal is applied via the variable top of resistor 512 across capacitor 507. Ultimately, the voltage across capacitor 502 and 507 achieve a proportional relationship such that the input signal supplied to amplifier 88 is a virtual ground.

The Rate network includes resistor 508 and capacitor 509 connected substantially in parallel. This network produces a delay in the feedback path of amplifier 88. This delay function produces an overall differentiating effect relative to amplifier 501 and error signal produced thereby. Resistors 510 and 511 are connected between the variable tap of resistor 512 and suitable reference potential, for example ground. These resistors provide a voltage dividing network to produce a useful potential at the Rate network. Essentially, the delay function produced by the Rate network in the feedback path operates to critically damp the system whereby anticipatory control is utilized to compensate for system inertia. That is, as the error signal approaches zero, for example, the Rate network effects an apparent change in the Proportional Band operation.

In one embodiment, the Rate network is effectively disabled during manual and computer control. This disabling is effected by means of a short-circuiting device (not shown). So that switchover to automatic control is at the computer or manual level and the delay action of the Rate network is avoided.

Figure 6:
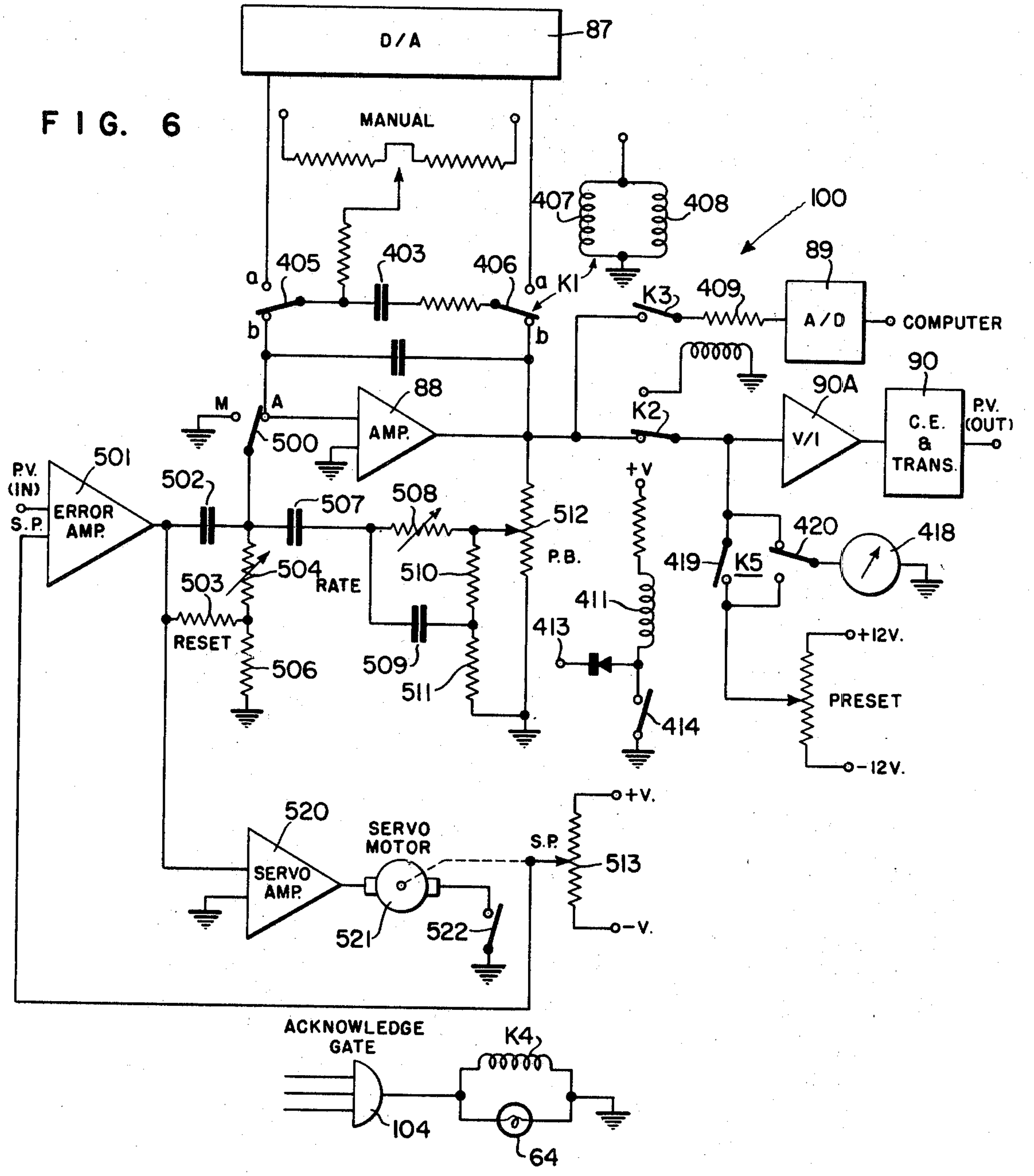
FIG. 6 is a modified version of the circuits shown in FIGS. 4 and 5.

Referring now to FIG. 6, there is shown another embodiment of the sample and hold amplifier circuit 100. This circuit is similar to the circuit shown in FIGS. 4 and 5. However, this circuit shown in FIG. 6, includes an additional degree of sophistication. In this circuit, means are supplied whereby the set point signal and the process variable signal control a servo loop. The servo loop provides a set point tracting of the process variable as a function of the error signal produced by error amplifier 501.

The circuit in FIG. 6, as noted, is similar to the circuits shown in FIGS. 4 and 5. Similar reference numerals in these figures relate to similar components. For example, the D/A converter 87 or alternatively the manual control, is selectively connected to the memory capacitor by means of switches 405 and 406. These switches are controlled by coils 407 and 408, respectively. Capacitor 403 is further connected across amplifier 88 by means of the same switches. The output of amplifier 88 is connected via switch K3 or switch K5 to the A/D converter 89 or to the output device 90 as the case may be. The Preset circuitry is identical to that described supra.

The input to amplifier 88 is supplied via switch 500 and may be either manual, automatic or computer. In the automatic condition, the input signal is controlled by Reset, Rate and Proportional Band networks as discussed supra. In addition, the setpoint (SP) signal is supplied by variable resistor 513. However, the output of error amplifier 501 is connected to one input of servo amplifier 520. The servo amplifier supplies a signal to servo motor 521. Servo motor 521 is mechanically coupled to the wiper arm of variable resistor 513 and causes relative motion thereof. Thus, if an error signal is detected between the PV and SP signals, error amplifier produces a signal which is supplied to servo amplifier 520. This signal is supplied to servo motor 521 when switch 522 is closed. The resultant motion in servo motor 521 drives the wiper arm of variable resistor 513 until the PV and SP signals are similar and an error signal is not produced.

Switch 522 is closed by means of acknowledge gate 104 which is connected to the coil K4 and lamp 64. A more detailed description of suitable circuitry of gate 104 is described in FIG. 2. With the proper signal to acknowledge gate 104, a energizing signal is supplied to coil K4 where switch 522 is closed. In the absence of a signal produced by gate 104, switch 522 remains open and the set point tracking apparatus is not operable.

Thus, the circuit shown in FIG. 6 provides the standard amplifier having sample and hold characteristics as described supra. This circuit has manual control at the input, a Preset or failsafe backup at the output and an error tracking apparatus which causes the error signal between the set point variable and the process variable to be as small as possible. With these additional circuits, during computer failure the output device controlled by amplifier 88 will remain at substantially the last operable condition until manually adjusted if there is no automatic analog loop involved. If such a loop is included, this loop may take control and produce the control operation.

Figure 7:
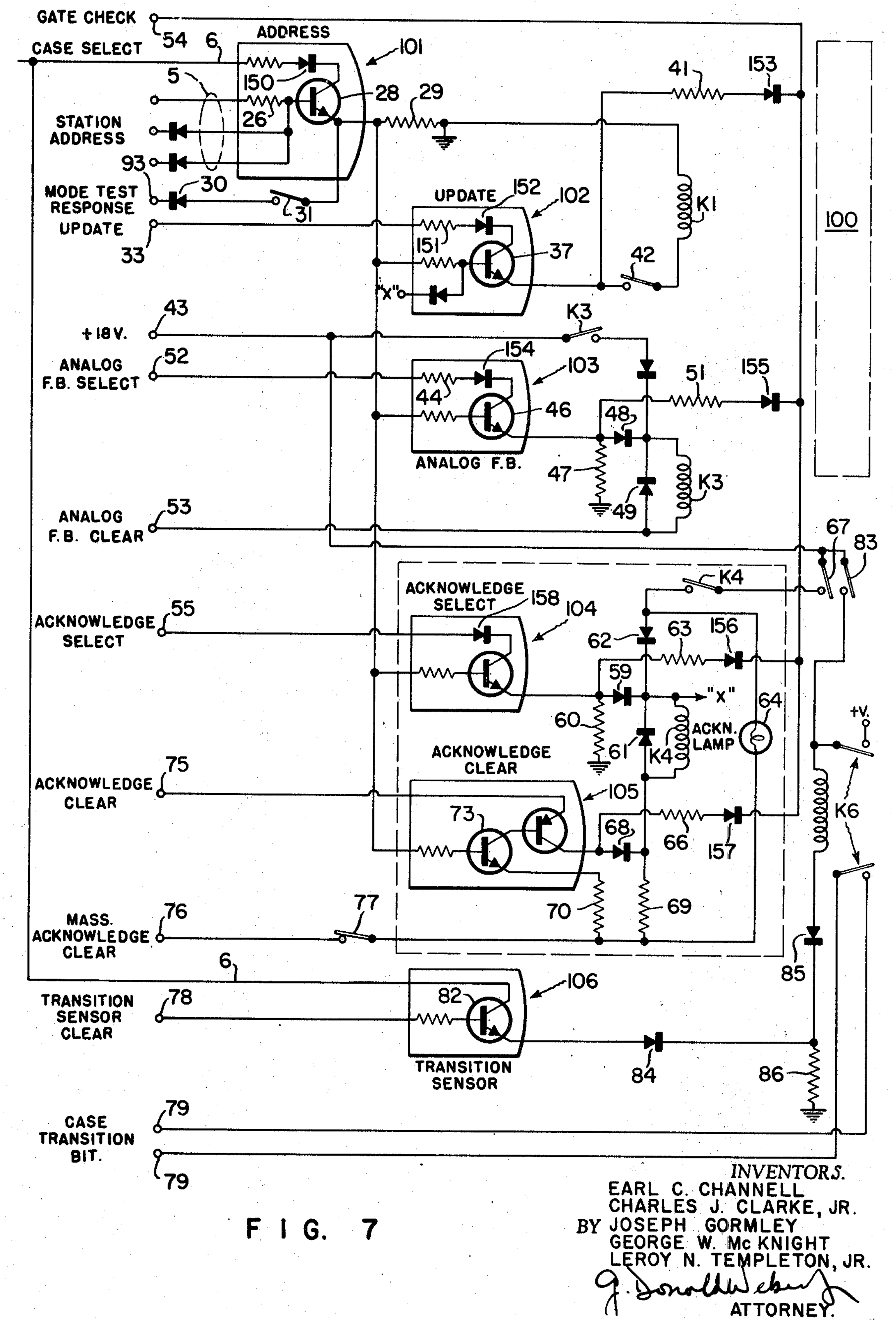
FIG. 7 is a schematic diagram of another embodiment of the invention and is a modified version of the diagram shown in FIG. 2.

Referring now to FIG. 7, there is shown another embodiment of the station circuitry as shown in FIG. 2. Components in FIG. 7 which are similar to those shown in FIG. 2 bear similar reference numerals. Basically, the operation of the circuit shown in FIG. 7 is similar to the operation of the circuit shown in FIG. 2. However, certain modifications between the circuits can be noted.

In FIG. 7, the block 100 is substantially identical to the network 100 shown in FIG. 2. The interconnections between the components and block 100 and the remainder of the station network are similar. The distinctions which are given between the two circuits include additions or deletions of components whereby improved operations is achieved. For example, in gate 101, a diode 150 is inserted in the circuit shown in FIG. 7. This diode permits more positive isolation of the address gates.

In gate 102, the series combination of resistor 151 and diode 152 are inserted between update terminal 33 and the collector electrode of transistor 37. These components replace diode 32 which is poled in the opposite direction in FIG. 2. In addition, the update signal is supplied directly to the collector of transistor 37 rather than to the base thereof. In addition, the circuit of gate 102 of FIG. 7 has been reduced both in complexity and in cost by the removal of PNP transistor 38. The redesign of gate 102 permits satisfactory operation with a single transistor.

Also, in analog feedback gate 103, a diode 154 has been inserted in series between resistor 44 and the collector electrode of transistor 56. This diode provides desirable isolation for gate 103.

In acknowledge select gate 104, diode 156 has been inserted in lieu of resistor 56 in the collector circuit. Diode 156, similar to diodes 152 and 154 in gates 102 and 103, respectively, provides more positive isolation between the circuits as well as the necessary voltage drop therein.

It is noted that diodes 153, 155, 156 and 157 are connected in series with the respective output resistors of gates 102–105. These coupling diodes are connected to the gate terminal 54 and are utilized to provide isolation whereby interaction between the gates at the reliability check circuit is avoided.

In addition, the normally closed contacts K4B have been eliminated and acknowledge lamp 64 is connected in series with normally opened contacts K4. In this configuration, the acknowledge lamp 64 is illuminated only when contacts K4 are closed. This configuration permits only the activated stations to display an indication light.

In addition, at acknowledge clear gate 105, resistor 71, which is connected between the emitter electrode of transistor 73 and the reference terminal 43 in FIG. 2, has been eliminated. The value of resistor 70 has been altered whereby a suitable biasing function is provided for transistor 73.

Referring to transistor sensor gate 106, resistor 80 in the collector circuit of FIG. 2 has been eliminated. This effects a reduction in component parts. However, if power dissipation problems exist in transistor 82, resistor 80 should be retained.

As noted supra, the operation of the circuit shown in FIG. 7 is substantially identical to the operation of the circuit shown in FIG. 2. Through the addition, deletion or modification of the components, the circuit shown in FIG. 7 provides certain desirable operating and manufacturing procedures. Of course, it is understood that for some purposes, the circuit shown in FIG. 2 may be more desirable.

Figure 8:
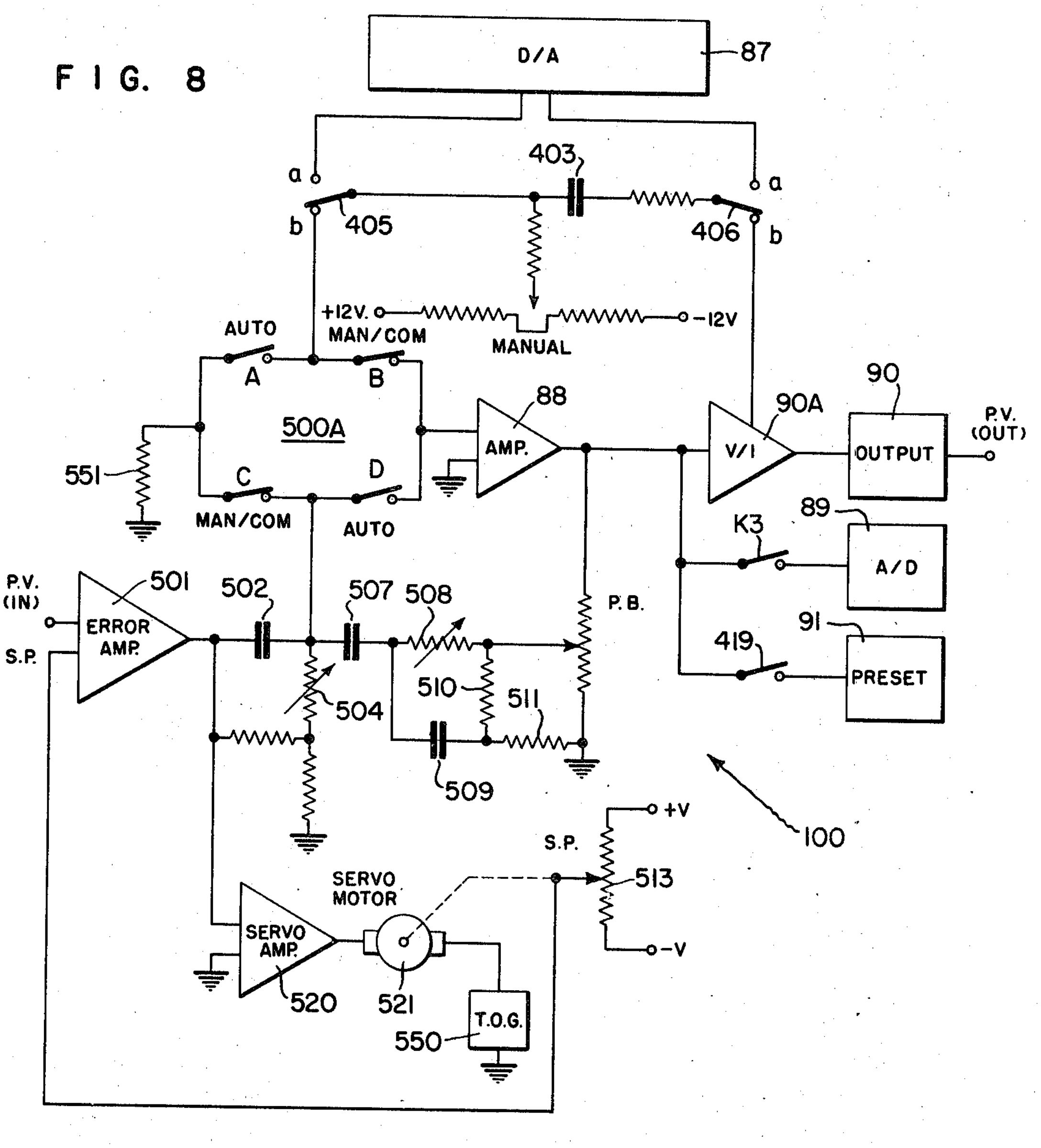
FIG. 8 is a modified version of the circuits shown in FIGS. 4–6.

Referring now to FIG. 8, there is shown another embodiment of the sample and hold amplifier station circuit 100. The circuit shown in FIG. 8 is partially schematic and partially block diagram. As in the circuits previously described, a D/A converter 87 is utilized to provide input information. The D/A converter 87 is connected to the contacts *a* of switches 405 and 406. Contacts *b* of switches 405 and 406 are connected to the storage capacitor 403. A manual backup control is also connected to the storage capacitor 403. The amplifier to which the information is supplied is operational amplifier 88. However, the input connections to amplifier 88 are modified. The switching circuit 500A comprises four contacts or terminals designated as A, B, C and D. The contacts may, in fact, comprise separate switches or they may be the contacts of four-way contact switch such as a relay or the like. It is noted that the switches operate in pairs; namely, contacts A and D and contacts B and C are associated in concurrently operated pairs. In the preferred embodiment, contacts B and C are normally closed and represent the manual computer connection. The contacts A and D are normally-open contacts and represent the automatic operational mode.

The switch circuit 500A is connected between an input to amplifier 88 and a suitable reference potential, for example ground, via resistor 551. The switch circuit 500A is connected such that the contacts A, B, C and D form a bridge-type network. Thus, with contacts B and C normally closed, the Reset circuit, as well as the servo backup and the like, are connected to ground via resistor 551. Likewise, contact *b* of switch 405 is connected to the input of amplifier 88 via normally closed switch B of switch circuit 500A. This connection arrangement permits the amplifier 88 to receive inputs which are supplied by the D/A converter 87 (part of the control computer) or from the manual backup or control.

In the opposite condition, namely with contacts A and D closed and contacts B and C open, terminal *b* of switch 405 is connected to ground via resistor 551 and contacts A. Likewise, the input of amplifier 88 is connected to the output of error amplifier 501 via closed contacts D and Reset circuit. Thus, in the automatic mode of control, input signals are supplied to amplifier from the error amplifier 501.

In the circuit embodiment shown in FIG. 8, the output of amplifier 88 is connected to the Proportional Band circuitry as well as the input to the power amplifier and conversion circuit 90A. Additionally, the output is selectively connected to the A/D converter 89 and the Preset network 91. It will be noted, that in this circuit the return to contact *b* of switch 406 is not made directly from output of amplifier 88. Rather, in this circuit the return is made via an output from the converter or power amplifier 90A. This circuit configuration has certain advantages for example, accuracy is improved due to availability of compensation for temperature changes and the like.

Also, the servo network comprising servo amplifier 520 and servo motor 521 are connected in series with a time-out gate (TOG) 550. This time-out gate is used in lieu of an acknowledge gate 104. It should be noted, that this time-out gate may be utilized in any of the circuits shown herein before. The time-out gate 550 is not described in detail inasmuch as it forms the basis of the copending application entitled Electrical Apparatus, bearing Ser. No. 582,109, filed on Sept. 26, 1966 by the same inventor and assigned to a common assignee. This circuit, as described in detail in the copending application, permits the servo loop to remain "on-line" so long as regularly supplied signals are provided by the computer. If the computer goes off line or is, for some reason, no longer in control of the operation, the time-out gate 550 completes its cycle and the servo network is removed from control. Furthermore, the time out gate alters the position of switch network 500A such the circuit is on automatic control. That is, the input to amplifier 88 is supplied by error amplifier 501.

Figure 9:
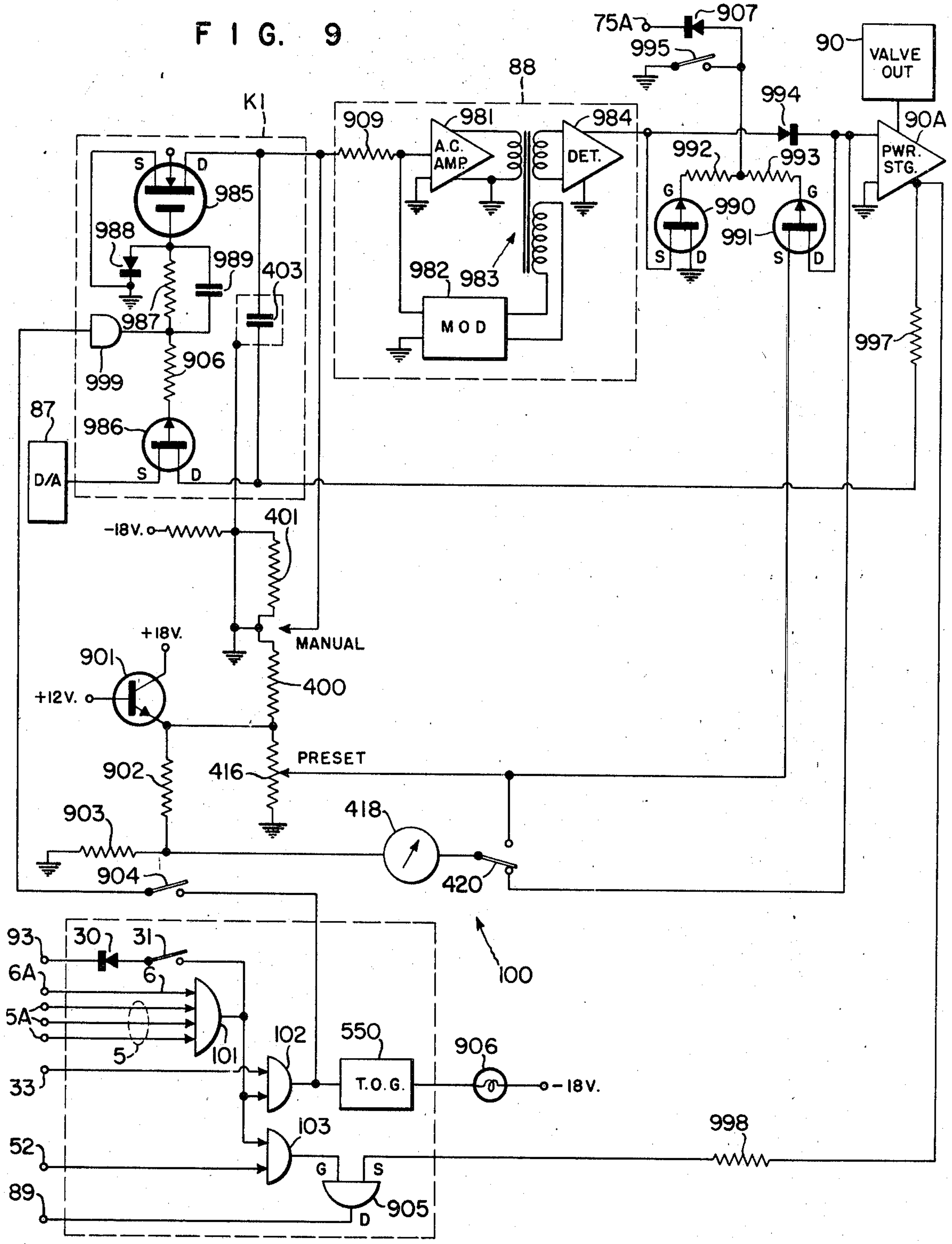
FIG. 9 is a modified version of the circuit shown in FIG. 8.

Referring now to FIG. 9, there is shown a partially schematic, partially block diagram of a sample and hold circuit 100 having different connections and different details. In addition, the circuit of FIG. 9 shown a simplified gating arrangement for detecting or determining which station and case is addressed. Again, components which are similar to components shown in other drawings bear similar reference numerals.

In FIG. 9 the D/A converter 87 is shown connected via switching apparatus K1 to an input of amplifier 88. The output of amplifier 88 is connected, via diode, 94 to power stage or converter 90A. The output of the power stage 90A is connected to the valve output 90. Another output of power stage 90A is returned, via resistor 997, to D/A converter 87 via switching circuit K1.

A signal is supplied to switching circuit K1 from the update gate 102 via driver circuit 999 to render switching circuit K1 selectively operable whereby the D/A converter 87 is connected to the memory capacitor 403. The switching circuit comprises the field-effect transistors 985 and 986 which are connected together at the gate electrode thereof by resistors 906 and 987. In particular, transistor 986 is a junction type field-effect transistor, while transistor 985 is an insulated gate field-effect transistor. The junction between resistors 906 and 987 is connected to the output of update gate 102 via switch 904 and driver circuit 999. When normally open switch 904 is closed a signal supplied by gate 102 is amplified by driver circuit 999 and applied to the gate electrodes of transistors 986 and 985.

A capacitor 989 is connected in parallel with resistor 987 to provide a high speed connection for high frequency signals. Furthermore, the RC network provides a differentiator circuit for operating upon input signals to shift the level thereof. In addition, the gate electrode of transistor 985 is connected to ground via diode 988. The source electrode of transistor 985 is also connected to ground or the suitable reference signal. The source electrode of transistor 986 is connected to the D/A converter 87. The drain electrodes of transistors 985 and 986 are connected to opposite sides of memory capacitor 403. In this embodiment, memory capacitor 403 is shown connected in a shielded configuration to avoid stray signals and inhibit leakage and drift. Thus, when the signal is supplied via switch 904 to inverting amplifier 99, a negative going signal is applied to the junction of resistors 906 and 987. The signal supplied to the gate electrode of transistor 986 via resistor 906 is a negative going signal for example from +18 volts to 0 volts. The RC network comprising resistors 987 and capacitor 989 serves to differentiate the signal supplied by amplifier 999 such that a negative going signal of 0 to −18 volts is supplied to the gate electrode of transistor 985. Thus, the circuit provides a two level switching signal where the separate signals are supplied to the gate electrodes of different transistors.

When transistors 985 and 986 are turned on, current flow exists from analog to digital converter 87, through memory capacitor 403, to ground. Capacitor 403, therefore, stores charge therein as a function of the potential of the signals provided by D/A converter 87. The signal developed across capacitor 403 is then applied, via resistor 909, to the input of AC amplifier 981 which is a portion of the amplifier network 88. The input signal is further applied to the modulator 982. The output of AC amplifier 981 is transformer coupled to modulator 982 and detector 984. It should be noted, on the termination of the signal supplied by gate 102, transistors 985 and 986 are turned off whereby the memory capacitor 403 is connected directly to the input of gate 88 while the D/A converter 87 is disconnected from the amplifier circuit.

The output of amplifier 88 is connected to power stage 90A via isolation diode 994. In addition, the output of amplifier 88 is connected to the source electrode of FET 990. The drain electrode of FET 990 is connected to a suitable reference potential, for example ground. The cathode of diode 994 and the input of power stage 90A are connected to the source electrode of FET 991. The drain electrode of FET 991 is connected to the wiper arm of variable resistor 416 which provides the Preset backup network. The gate electrodes of FET's 990 and 991 are connected via resistor 992 and 993 to remote Preset circuits. The input of power stage 90A is selectively connected via switch 420 to meter 418 which is connected to a suitable potential source. Through this means, the output of amplifier 88 may be detected.

One output of power stage 90A is connected directly to the valve output 90. Another output of power stage 90A is connected, via resistor 997, to the junction between the drain electrode of transistor 986 and one side of memory capacitor 403. This feedback or circuit completing network connects the memory capacitor across the amplifier and power stage especially when the FET's 985 and 986 are not conducting. The second output of power stage 90A is further connected to resistor 998. Resistor 998 provides a feedback to one input of latching gate 905 which is shown schematically. This output provides the analog when the proper gates are complexed. Latching gate 905 is more fully described hereinafter.

The analog output multiplexing is achieved by means of supplying suitable signals to gate 905. The input signals to gate 905 are supplied by the analog output of power stage 90A and the feedback enable signal which is provided by feedback gate 103. Gate 103 is enabled by the simultaneous application of a feedback enable signal at terminal 52 and the application of proper address signals to gate 101. The output signal produced by gate 905 is detected at terminal 89 and is the analog output of the circuit.

The lamp 906 is connected between a suitable reference potential source and time-out gate 550, noted supra. When timeout gate 550 is disabled, lamp 906 is energized and illuminated.

In the circuit shown in FIG. 9, a controlled potential source is provided by transistor 901. The collector electrode of transistor 901 is connected to a suitable reference potential source. The base of transistor 901 is connected to a suitable reference source, for example by means of a Zener diode or the like (not shown). A voltage divider network comprising resistors 902 and 903 is connected between the emitter electrode of transistor 901 and a suitable reference potential, for example ground. The potentials which are available at the voltage divider network are connected for example to meter 418, which is connected at the junction between resistors 902 and 903. The manual backup control network and the Preset control network are connected to the emitter of transistor 901.

The Preset network comprises resistor 416 which is connected between the emitter electrode of transistor 901 and a suitable reference potential, for example ground. The wiper arm of variable resistor 416 is connected, as noted supra, to the input of power stage 90A via FET 991.

The manual control network comprising resistors 401 and 400 is connected between a suitable reference potential source, for example −18V, and the emitter electrode of transistor 901. The center junction of the resistors of the manual backup network is connected to ground. The wiper arm associated with resistors 401 and 400 is connected to the input of amplifier 88 via resistor 909.

The operation of the circuit shown in FIG. 9 is similar to the operation of the circuits shown in preceding figures. The input signal is supplied by the gating network via amplifier 999. The input signal is effective to render transistor 985 and 986 operative whereby capacitor 403 is selectively charged. Amplifier 88 operates upon the signal developed across capacitor 403. The signal produced by amplifier 88 is supplied to power stage 90A and to the output device 90. The backup stage is connected to an input of power stage 90A whereby a backup signal is selectively provided via switch 420. Thus, as noted supra, meter 418, when connected in the configuration shown, records the value of the input supplied to power stage 90A. Switch 420 may be selectively altered to engage the other contact thereof whereby the meter 418 indicates tthe value of the signal produced by the Preset circuit, specifically resistor 416. Preset resistor 416 may be adjusted until meter 418 indicates that the signal produced by the Preset circuit is substantially identical to the input signal supplied to power stage 90A from amplifier 88. Thus, in the event that computer failure or some similar event occurs, the Preset backup signal may be supplied to power stage 90A.

The Preset signal is supplied via FET 991. Transistor 991 has the source electrode thereof connected to Preset resistor 416 and the drain electrode thereof connected to the input of power stage 90A. The gate electrode is connected to the gate electrode of FET 990 via series connected resistors 993 and 992. FET 990 has the source electrode thereof connected to the output of amplifier 88 and the drain electrode thereof connected to ground. The gate electrode of FET 990 is connected to the series connected resistors 992 and 993. The junction of resistors 992 and 993 is connected to the anode of diode 97 and one contact of normally open switch 995. The cathode of diode 997 is connected to a remote Preset selecting network which may be in the computer. The other terminal of switch 995 is connected to suitable reference potential source such as ground.

The signal normally supplied at terminal 75A (which terminal is analogous to the mass acknowledge clear terminal of FIG. 2) is normally a relatively positive signal. Thus, diode 907 is normally reverse biased and a signal is not transmitted thereby to the switching circuit 900. Similarly, since switch 995 is normally open, there is no connection made between ground and switching circuit 900. In the event that a low level signal is applied at terminal 75A wherein diode 907 is rendered conductive, or switch 995 is closed wherein a ground potential is connected thereacross, a low level signal is applied to the junction between resistors 992 and 993. This low level signal is transmitted by the resistors to the gate electrodes of the respective FET's. When FET 990 is turned on by the application of a low level signal to the gate electrode thereof, conduction between the source and drain electrodes exists. This current conduction has the effect of shorting the output of amplifier 88 to ground. Thus, amplifier 88 is no longer effective in the drive operation of valve output 90.

Simultaneously, gate 991 is rendered conductive by the application of a low level signal to the gate electrode whereby current conduction from the source to the drain electrode exists. This conduction electrically connects the wiper arm of Preset resistor 416 to the input of power stage 90A. Thus, the output 90 is driven via power stage 90A, by the Preset circuit and the position is controlled by the condition of this circuitry.

Thus, it is seen that the circuit shown in FIG. 9 is a sample and hold amplifier circuit similar to those described but wherein almost no electro-mechanical action is required. That is, the switch circuitry shown in FIG. 9 utilizes semiconductor devices to effect switching. This switching is more reliable and, generally, much faster than relay or other electro-mechanical switching.

Referring now to FIG. 10, there is shown a detailed circuit diagram of the configuration of gates 103 and 905 as shown in FIG. 9. The input terminals to gate 103 (shown dashed) are labelled 506 and 507. One of these inputs is equivalent to input 52, shown in FIG. 9 and other figures while the other input is supplied by the address gate 101. Input 506 is connected via resistor 500 to the cathode of diode 501. Input 507 is connected to the anode of diode 502. The cathode of diode 502 is connected to the anode of diode 501. This common connection is further connected to one side of capacitor 503. Another side of capacitor 503 is connected to a suitable reference potential, for example +V, where +V may be on the order of +18 volts. The common junction between the diodes and the capacitor 503 is connected to the gate electrode of FET 505 via coupling resistor 504. The source and drain electrodes of FET 505 are suitably connected in the current path of a controlled circuit. For example, as shown in FIG. 9, the source and drain electrodes are connected in the multiplex analog feedback circuit. Thus, FET 505 operates as a switch through which a particular circuit may be selectively energized. The input signals Q and R are supplied to the terminals 506 and 507, respectively. It is assumed that, initially, both the Q and R signals are high level signals. High level input signal Q is effective to reverse bias diode 501. Since the high level signal supplied at terminal 507 is of substantially the same magnitude as the high level signal supplied at +V (connected to capacitor 503) diode 502 is relatively zero biased. Consequently, FET 505 remains in the high resistance state, and exhibits, for example, on the order of $10^9$ ohms and approximates an open circuit.

At T1, the potential at V, i.e. the gate electrode of FET 505, remains high even though input signal R switches to a low level or ground potential signal. That is, diode 501 is reverse biased by the high level input Q signal and diode 507 is now reverse biased by the low level input signal R.

At time T2, a low lever signal is simultaneously applied to the terminals 506 and 507. Thus, diode 502 is reverse biased but diode 501 is forward biased. A current path now exists from +V through capacitor 503, through diode 502 and resistor 501 to the low level potential at terminal 506. Thus, capacitor 503 now stores charge therein. During the charging operation of capacitor 503, the potential at V is substantially reduced from +18 to 0 volts. This low level potential is applied at the gate electrode of FET 505 whereby this diode is turned on. When FET 505 is turned on, it exhibits a low resistance state, on the order of about 200 ohms.

At time period T3, input signal Q which recently switched low to cause charging of capacitor 503 now switches to a high level signal. This high level signal reverse biases diode 501. However, inasmuch as the diode 502 is also reverse biased, capacitor 503 is unable to be discharged (ignoring negligible leakage current). So long as capacitor 503 remains substantially fully charged, FET 505 remains in the conductive state and the source and drain electrodes are effectively connected together electrically.

At T4, input signal R returns to the high level state. Thus, both the Q and R inputs are high level signals. Thus, diode 501 is reverse biased but diode 502 is forward biased. The high level signal across diode 502 causes capacitor 503 to discharge. Therefore, the potential at terminal V switches from 0 to +18 volts. With a high level signal applied to the gate electrode of FET 505, the semiconductor becomes non-conductive and reverts to the high resistance state.

Thus, common operation and coincidence of Q and R pulses for operation is required. Once the FET is rendered conductive, it is necessary to retain only the R input signals to maintain conduction. While the circuit permits conduction through the FET, the Q input signal is not required and is free to perform other functions. Thus, a unique latching gate is produced.

The circuit shown in FIG. 10 uses a P channel junction FET. It is known that an insulated gate FET circuit may be utilized, with necessary and desirable changes in polarities of signals and components.

There has thus been described a system for providing interfacing circuitry between a large number of remote units and a centralized control element. This system permits unique control functions to be utilized. Several embodiments of circuits or networks are described. The system and subsystems which form the embodiments are illustrative only. The specific circuits shown and described are not meant to be limitative of the invention. Rather, as suggested both within the instant description and the cited copending applications, modifications to the circuits may be readily suggested to those skilled in the art.

The embodiments of the invention in which an exclusive property or privilege is claimed are defined as follows:

1. A control system comprising a plurality of controller means, at least one control station individually associated with each of said controller means, each control station being adapted to receive functional input signals from a common source means, connection means connecting said source means to said control stations in parallel whereby said functional input signals are supplied in parallel to all control stations, coded selection means for selectively energizing individual control stations to be responsive to said input signals whereby said functional input signals can be operated upon, and computing means for supplying coded selection signals and said functional input signals, said coded selection signals being supplied to said coded selection means, said common source means being included in said computing means.

2. The control system recited in claim 1 wherein said control station comprises sample and hold amplifier means, means for receiving said functional input signals, and switch means for selectively connecting said means for receiving to said amplifier means whereby said functional signals can be operated upon.

3. The control system recited in claim 1 wherein said coded selection means includes first gate means, and second gate means connected to said first gate means to be controlled thereby, said second gate means selectively passing said functional input signals in response to the control exercised by said first gate means.

4. The control system recited in claim 1 wherein said controller means include means for affecting the condition of a physical system.

5. The control system recited in claim 4 wherein said computing means comprises digital computer means, and means relating the condition of said physical system to said digital computing means such that said digital computing means may operate thereon and provide suitable functional input signals.

6. The control system recited in claim 1 wherein said coded selection means includes a plurality of switch means, each of said switch means requiring at least two coincident signals of the same polarity from said computing means to produce a relatively conductive condition, one of said switch means having the output thereof connected to an input of each of the others of said plurality of switch means, each of said others of said plurality of switch means having at least one input thereof connected to said computing means.

7. The control system recited in claim 6 wherein each of said switch means includes at least one semiconductor device, each of said semiconductor devices having at least three electrodes one electrode of each said semiconductor device of said others of said plurality of switch means connected to a similar electrode on each other and to a different electrode of the semiconductor device of said one switch means.

8. The control system recited in claim 7 wherein each of said other switch means is associated with relay means, said relay means being operative to effect control of said control system in accordance with commands from said computing means.

9. The control system recited in claim 1 including logic circuit means for selectively controlling the passage of signals, said logic circuit comprising field effect semiconductor means, gate means, energy storage means connected between said gate means and said field effect semiconductor means, said gate means being rendered conductive by the application of enabling signals thereto, said energy storage means storing energy therein in response to said gate means being conductive, said energy storage means maintaining said field effect semiconductor means conductive when energy is stored therein.

10. The control system recited in claim 1 including transition sensing means for detecting a change in condition of a control station, said transition sensing means including switch means and relay means, said switch means controlling the operation of said relay means, means connecting said relay means to said computing means to indicate the transition of a control station from one condition to another.

References Cited

UNITED STATES PATENTS

| | | | |
|---|---|---|---|
| 3,034,718 | 5/1962 | Freitas et al. | 235—151 |
| 3,237,186 | 2/1966 | Whelpley et al. | |
| 3,268,665 | 8/1966 | Miller et al. | |
| 3,300,759 | 1/1967 | Chapman | 340—147 XR |
| 3,397,386 | 8/1968 | Bishup et al. | 340—151 XR |
| 3,445,813 | 5/1969 | Price | 340—150 |

DONALD J. YUSKO, Primary Examiner

U.S. Cl. X.R.

340—163